United States Patent

[11] 3,611,951

| [72] | Inventor | Gordon E. Sloan |
| | | Anaheim, Calif. |
| [21] | Appl. No. | 862,757 |
| [22] | Filed | Oct. 1, 1969 |
| [45] | Patented | Oct. 12, 1971 |
| [73] | Assignee | Logic Display Corporation |

[54] FOOD EXTRUDING MACHINE
14 Claims, 8 Drawing Figs.

[52] U.S. Cl. ................................................ 107/14 BA, 146/62, 222/387
[51] Int. Cl. ................................................ A01f 29/00, A01f 35/22, A01d 55/02
[50] Field of Search ................................... 107/14 BA, 14 CA, 14 A, 14 B; 18/12 TS, 12 P; 146/62, 78, 151; 222/387

[56] References Cited
UNITED STATES PATENTS

| 1,955,342 | 4/1934 | Pizzini | 107/14 BA |
| 2,581,294 | 1/1952 | Read | 100/288 |
| 3,344,752 | 10/1967 | Ilines | 107/14 BA |
| 3,470,830 | 10/1969 | Carter | 18/12 P |

FOREIGN PATENTS

| 1,394,848 | 0/1965 | France | 107/14 BA |

*Primary Examiner*—John E. Murtagh
*Attorney*—Pastoriza & Kelly

ABSTRACT: A food-extruding machine has a ram coupled to a piston that compresses moldable food product held in a container through aligned openings of a removable extrusion plate and a severing plate. When the severing plate is moved to shift the extrusion plate and severing plate openings out of alignment then the food product extrusions are chopped into chunks. The extrusion and severing cycle is repeated until the ram-driven piston has exhausted all the food product from the container.

The extrusion lengths may be varied by an adjustable control. The extrusion plate and a retaining recess for holding the extrusion plate have matched locating edges so that the extrusion plate openings and severing plate openings can be quickly and accurately aligned.

PATENTED OCT 12 1971

INVENTOR:
GORDON EDWARD SLOAN

BY

*Pastoriza & Kelly*
ATTORNEYS

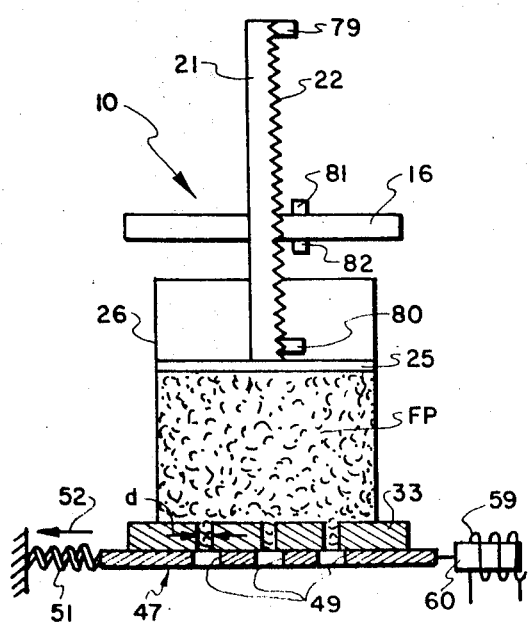
FIG. 5
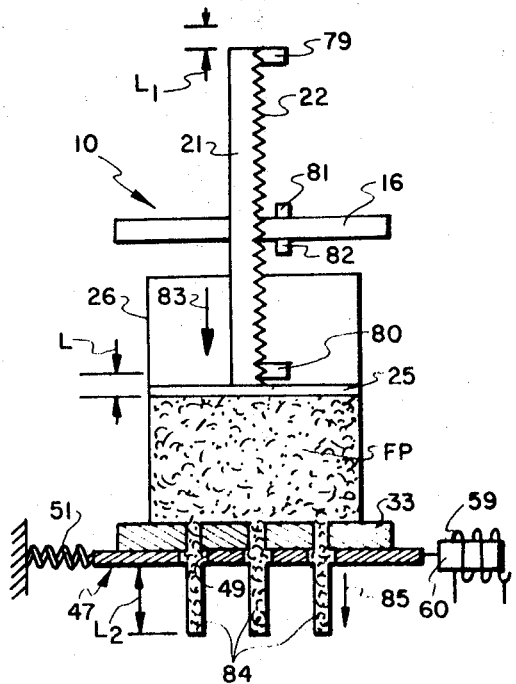
FIG. 6
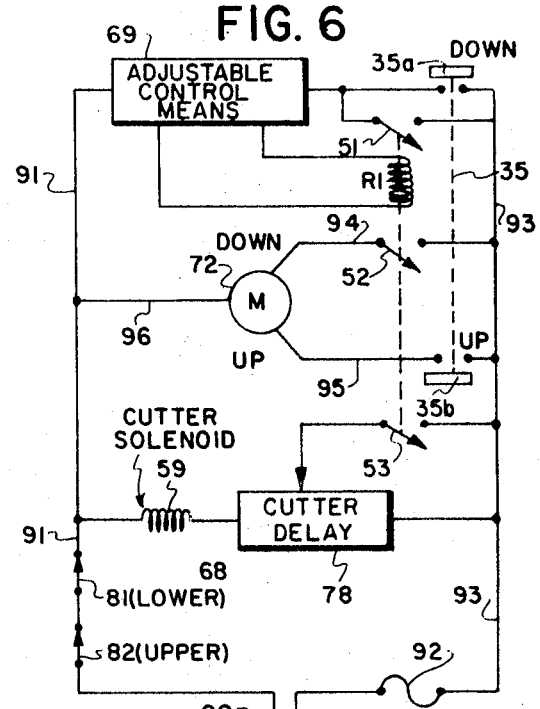
FIG. 8
FIG. 7
INVENTOR:
GORDON EDWARD SLOAN
BY
Pastoriza & Kelly
ATTORNEYS

FOOD EXTRUDING MACHINE

BACKGROUND OF THE INVENTION

This invention relates to food-handling equipment and more specifically to a food extrusion machine capable of extruding mouldable food product to a desired selected length and severing the resulting extrusions.

Equipment and techniques have been proposed for dispensing various types of mouldable food product by first compressing the food product through one or more extrusion openings and then slicing the one or more resulting food extrusions with a cutter plate for further treatment or use, as disclosed in U.S. Pat. No. 2,006,643 to Leo entitled SLICING APPARATUS granted July 2, 1935 and U.S. Pat. No. 3,057,523 to Rietz entitled MEAT DISPENSER FOR PIZZA PRODUCTION granted Oct. 9, 1962.

Conventional food extruders are ordinarily bulky, heavy, expensive and require excessive manual attention and assistance from external energy sources. In addition these food extruders cannot be easily dissembled for sterilization and cleaning purposes as is often required by various governmental health and safety regulations.

When these known extruders operate automatically or semiautomatically, the customary gear train between a remote or external motor, whose energy is used for compressing the food product and slicing the resulting food extrusions, is complex and prone to frequent malfunctionings.

BRIEF SUMMARY OF THE INVENTION

Briefly stated, this invention comprehends a food-handling machine for producing food product extrusions and severing them into chunks.

In its broadest aspects the machine has a framework which may be in the form of a stand, and, a mounting structure that is coupled to the framework and formed with a retaining recess sized to hold a removable extrusion plate that defines a plurality of extrusion openings. An elongated ram, preferably vertically oriented, is connected at its lower end to a piston for compressing mouldable food product confined in a container seated on the extrusion plate. A drive means is arranged to thrust the ram from a retracted position to an extended position towards the extrusion plate and an adjustable control means is associated with the drive means for controlling the driving duration and distance of ram travel in order to regulate the length of the food product extrusions. Severing means movably coupled to the mounting structure is operated by an actuating means that forces the severing means to travel from a first position to a second position during which travel the food product extrusions are severed into chunks.

As the extruding and severing cycle is repeated the ram is moved progressively closer to the extrusion plate until the piston eventually empties all the food product from the container. The ram is then restored to its fully retracted position and the container is either replenished or replaced with another full container.

The severing means preferably includes a plurality of cutter edges defining cutter holes arranged to be aligned with corresponding extrusion openings when the severing means is maintained at its first position. When the actuating means forces the severing means through its severing stroke then the extrusion openings and cutter holes become misaligned and the cutter edges chop the food product extrusions which may be collected in a catch basket or the like.

The actuating means is characterized preferably by at least one solenoid whose plunger is detachably coupled to the severing means. A return spring with its opposite ends fastened to the mounting structure and severing means is positioned to return the severing means to its first position upon deenergization of the solenoid. A guide means is removably coupled to the mounting structure in order to facilitate sliding movement of the severing means, and, a safety shield is coupled to the underside portion of the severing means in order to prevent a person from inadvertently inserting his hand in the area where the severing means and actuating means are coupled together.

The drive means preferably includes a reversible motor coupled to a pinion gear and a series of teeth on one wall portion of the ram constituting a rack arranged in meshing engagement with the pinion gear.

The extrusion plate and retaining recess are formed with matched locating edges so that when the extrusion plate is inserted in place its openings become arranged in perfect alignment with the cutter openings. The extrusion plate is preferably formed with a seating groove shaped to receive a radially inwardly extending lip defined by a bottom open end portion of the container.

BRIEF DESCRIPTION OF THE DRAWINGS

The numerous benefits and unique aspects of the present invention will be fully understood when the following detailed description is studied in conjunction with the drawings in which:

FIG. 5 is a schematic view showing the extrusion openings and cutter holes aligned just before the ram is urged downwardly;

FIG. 6 is a schematic view of a condition sequential to that of FIG. 5, showing the ram displaced downwardly by a distance sufficient to form food product extrusions of a predetermined length;

FIG. 7 is a schematic view of a condition sequential to that of FIG 6, showing the severing means shifted laterally to its extreme cutting position upon energization of the solenoid so that the food product extrusions are chopped into chunks and deposited into a catch basket; and, FIG. 8 is a diagram illustrating an electrical circuit employed to assist in operating the food extruding machine.

DETAILED DESCRIPTION OF THE PREFERRED EMBODIMENT

Figure 1:
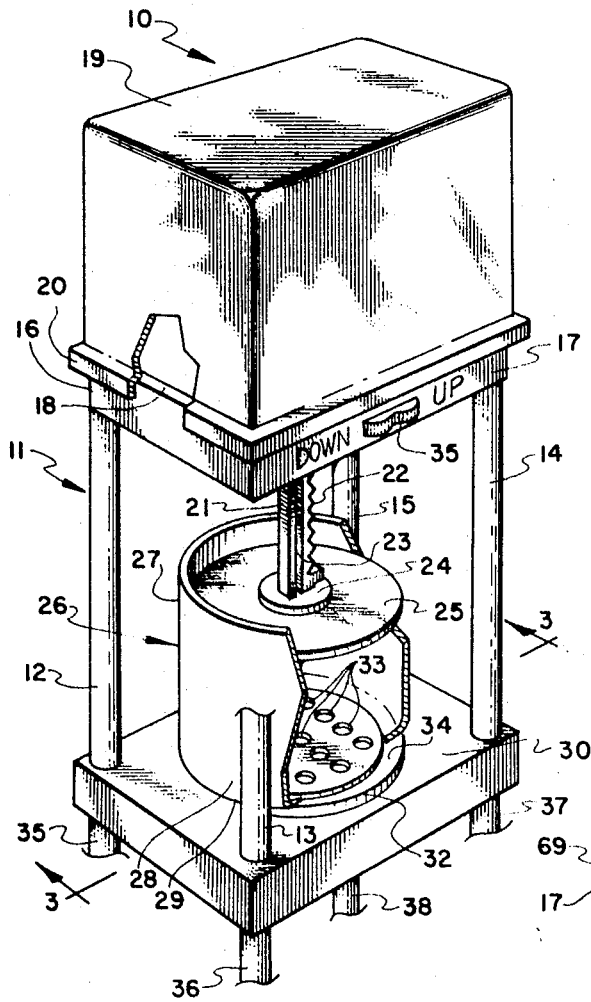
FIG. 1 is a perspective view with portions broken away, showing the food extruding machine with the food product container positioned on the extrusion plate.

Referring primarily to FIG. 1, a food extruding machine 10 is shown having an open framework 11 in the form of a stand with four legs or vertical posts 12, 13, 14 and 15. Framework 11 incorporates a rectangular platform 16 formed at its outer periphery with a raised sidewall 17 that terminates upwardly in an edge 18. A hollow block-shaped cover or hood 19 is formed at its lower section with an outwardly and then downwardly extending skirt 20 shaped to overlap and seat on sidewall edge 18.

Extending vertically through the central portion of platform 16 is an elongated ram 21 formed along one sidewall portion with a series of teeth that constitute a rack 22. Another longitudinally extending sidewall portion of ram 21 defines a guide slot 23. The lower end of ram 21 is integrally formed with or connected to a pressure plate 24 structured for detachable connection to a piston 25 of larger diameter. The adjacent faces of pressure plate 24 and piston 25 may, for example, be formed with a peg and socket sized to interfit with one another.

A cylindrically shaped container 26 for containing food product is arranged beneath platform 16. Container 26 has an open upper end 27 for receiving piston 25 in sealing engagement and a lower open end 28 formed with a radially inwardly extending lip 29 (best seen in FIG. 3).

Figure 2:
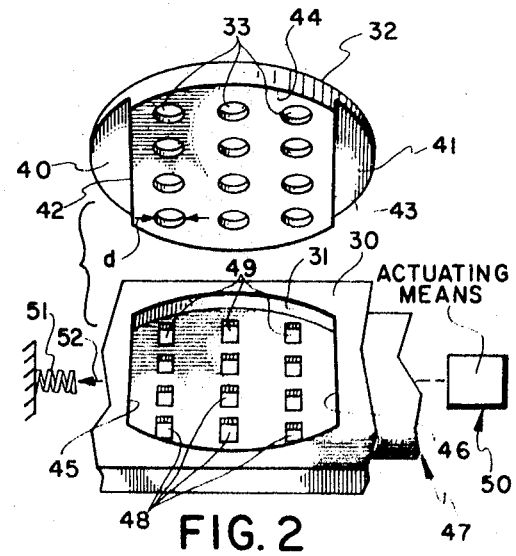
FIG. 2 is an exploded, partially schematic view, showing the extrusion plate openings and cutter holes of the severing means in alignment.
Figure 3:
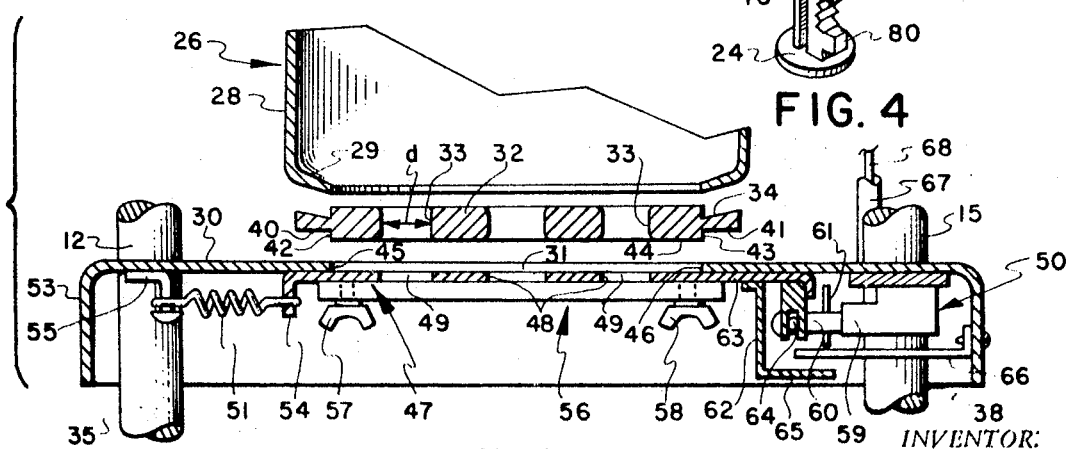
FIG. 3 is essentially a sectional view taken along line 3—3 of FIG. 1 with the food product container and extrusion plate exploded upwardly, showing the severing means in its noncutting position.

A mounting structure 30 connected to framework 11 and aligned generally parallel with platform 16 is formed with a central retaining recess 31 (best seen in FIG. 2 and FIG. 3). A generally circular-shaped extrusion plate 32 is seated within the retaining recess 31 and defines a plurality of extrusion openings 33. For purposes of illustration the openings 33 are shown in a pattern of three rows with four openings 33 in each row. The shape of extrusion plate 32 and its complementary shaped retaining recess 31 could be oval, square or any other desired convenient geometry. The upper face of extrusion plate 32 defines an annular seating groove 34 for seating container lower end 28.

A double-throw electrical switch 35 is mounted on platform 16 for causing ram 21 to travel up or down in a manner to be fully described. The vertical posts 12, 13 14 and 15 have lower extensions 36, 37, 38 and 39 respectively that permit extrusion plate 32 and the various structure immediately beneath it to be arranged over a catch basket (shown in FIG. 7) or a conveyor for collecting severed or chopped food product extrusions as shall be fully described.

Most of the components of food extruding machine 10 are preferably constructed from cold rolled steel; extrusion plate 32 and piston 25 are fabricated from acrylic plastic; and, hood 19 is constructed from ABS plastic.

Referring to FIG. 2 extrusion plate 32 is formed at diametrically opposed sections with a pair of notches 40 and 41 that define a pair of depending locating edges 42 and 43 respectively. Notches 40 and 41 assist in defining an extrusion plate insert segment 44 shaped to fit into retaining recess 31. In a similar manner retaining recess 31 defines a diametrically opposed pair of locating edges 45 and 46 matched to the extrusion plate locating edges 42 and 43 respectively.

Immediately beneath retaining recess 31 is a severing means 47 shown and described for purposes of illustration as a thin rectangular plate. Severing means 47 defines a series of cutter edges 48 which describe a plurality of cutter holes 49. During ordinary nonsevering conditions the extrusion openings 33 and cutter holes 49 become automatically arranged in registering alignment when the extrusion locating edges 42 and 43 are interfitted against the corresponding locating edges 45 and 46. The depth of the extrusion plate insert segment 44 is sized to be approximately equivalent with the thickness of mounting structure 30 so that the exit ends of extrusion openings 33 will lie immediately adjacent the inlet ends of cutter holes 49.

Severing means 47 is coupled to an actuating means 50 that functions to force the severing means 47 from a first position (as shown in FIG. 2, FIG. 3, FIG. 5 and FIG. 6) and a second position (as shown in FIG. 7) during which travel food product extrusions are severed into chunks of a desired length. Actuating means 50, which is carried by the framework 11, is preferably in the form of one or more solenoids. After the actuating means 50 has urged the severing means 47 to achieve severing of the food product extrusions then a return spring 51 mounted to mounting structure 30 causes severing means 47 to return to its initial or normal position as indicated by directional arrow 52. The maximum distance across the equally sized extrusion openings 33 in the direction of cutting action is represented by numeral $d$.

Referring to FIG. 3 it can be seen that radially inwardly extending lip 29 of container 26 is shaped to snugly rest in seating groove 34, and, the depth of extrusion plate insert segment 44 is substantially equivalent with the depth of that portion of mounting structure 30 which defines the retaining recess 31.

Mounting structure 30 has a depending sidewall 53 that extends below severing means 47 and actuating means 50 for safety purposes and also to conceal these various components. The farthest or distal end 54 of severing means 47 is coupled to one end of return spring 51 and the opposite end of return spring 51 is secured to a lug 55 spot-welded to the undersurface of mounting structure 30. The biasing force of spring 51 constantly urges severing means 47 to the left in which position the extrusion openings 33 and cutter holes 49 are held in perfect alignment.

A guide means 56 is shown in the form of a narrow bar that laps and slidably engages an undersurface portion of severing means 47. In practice a pair of laterally spaced slide bars would be secured beneath opposing margin segments of the severing means 47 so that severing means 47 could be guided along a straight path between its cutting and noncutting positions. A pair of wing nuts 57 and 58 can be easily manipulated to assist in removing severing means 47 so that it may be sterilized, cleaned, repaired, otherwise serviced or replaced if severely damaged.

The actuating means 50 is shown in the form of a solenoid 59 having a retractable plunger 60 and a stop 61 for limiting the retraction displacement of plunger 60. A transversely extending cutter yoke 62 is fixed to the underside of the proximal end 63 of severing means 47. Cutter yoke 62 has a series of intermediate retaining slots (not shown) sized to receive and interfit with the outer ends of the one or more solenoid plungers 60. Yoke 62 has a longitudinally extending retaining opening for receiving a securement rod 64 that passes through and thereby interlinks the ends of the solenoid plungers 60. When multiple solenoids are employed they are simultaneously energized to pull cutter yoke 62 to the right and thereby slide severing means 47 through its cutting stroke.

A safety shield 65 is fixed to the undersurface of severing means 47 and has a portion that underlies the innermost end of a cover plate 66 secured to mounting structure sidewall 53. Sufficient vertical and lateral clearance exists between safety shield 65 and cover plate 66 so that no interference with cutting action results. The primary function of safety shield 65 is to prevent a person from inadvertently inserting his hand or fingers into the area where the severing means 47 and actuating means 50 are coupled together, during a cutting stroke.

An insulating tube 67 secured to vertical post 15 carries an electrical conductive wire 68 for transmitting the electrical current from a suitable electrical circuit for energizing solenoid 59.

Figure 4:
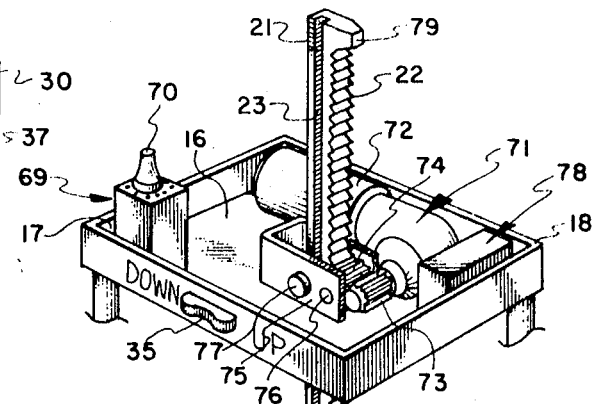
FIG. 4 is a perspective view similar to that of FIG. 1 with the hood removed, showing details of the food extruding machine.

Referring now to FIG. 4, an adjustable control means 69 is mounted to platform 16. Adjustable control means 69, which may be an adjustable time delay relay has a manually operable dial 70 whose position can be varied to regulate the length of food product extrusions, as shall be fully explained. A drive means 71 includes a reversible motor 72 with a drive shaft gear 73 interengaged with a pinion gear 74. Pinion gear 74 drivingly engages the teeth of rack 22. A U-shaped bracket 75 of platform 16 mounts pinion gear 74 by an axle or pin 76 and also mounts a stationary guide pin 77 whose inner end fits into guide slot 23. Coaction between guide slot 23 and guide pin 77 forces ram 21 to travel in a straight path along its longitudinal axis.

A time delay means 78 in the form of a time delay relay operates to initiate the action of the actuating means 50 (shown in FIG. 3) after the driving action of drive means 71 has been stopped for a predetermined time period. Since motor 72 may ordinarily tend to overrun or coast after it has been shut off and thereby drive ram 21 through an additional downward increment of distance, time delay means 78 operates to prevent the severing means 47 from commencing its severing action prematurely. Otherwise, both the desired longer food product extrusions and undesired thin slices or caps of food product would be formed during the cutting stroke and retraction stroke of the severing means 47, respectively. A cam 79 for engaging a normally closed first limit switch is carried by a top portion of ram 21 and another cam 80 for engaging a different limit switch is carried by a lower portion of ram 21.

Referring to FIG. 5 a limit switch 81 coacts with cam 79 to indicate the extreme lower travel position of ram 21, and, a limit switch 82 also carried by platform 16 is arranged to coact with cam 80 in order to indicate the upper extreme travel position of ram 21.

The food product FP to be extruded is mixed and otherwise treated to a mouldable consistency so that it may be formed into the desired extrusions. The food product FP may for example be in the form of potato meal for making french fries, fish meal for making fish fillets, ground meat for making meat chunks, banana meal for making banana chunks, or the like. By way of further example when it is desired to make french fries with food extrusion machine 10 then the potato meal may be premixed to the necessary consistency and stored within container 26 for convenience.

FIG. 5, FIG. 6, and FIG. 7 which illustrate important sequential conditions of the food extrusion machine 10 during an extrusion-severing cycle will be more fully discussed in connection with the following description of the operation of the invention.

Referring to FIG. 6 the distance $L_1$ represents the extrusion stroke of ram 21 in direction 83 for yielding food product extrusions 84 of the desired length $L_2$. When the mass of food product FP is compressed by piston 25 the extrusions will be expressed downwardly in direction 85.

In FIG. 7 severing means 47 experiences a severing stroke to the right upon energization of solenoid 59 whose plunger is drawn into the solenoid coil in direction 86. When the food product extrusions are severed by abrupt misalignment between the extrusion openings 33 and cutter holes 49, the resulting food product extrusion chunks 87 fall gravitationally in direction 88 into hopper or catch basket 89. Referring again to FIG. 5, when solenoid 59 is deenergized then the biasing force of return spring 51 restores severing means 47 to the position it occupied at the beginning of the severing stroke.

FIG. 8 shows schematically a simplified circuit diagram for the adjustable control means, driving motor, cutter delay control, and cutter solenoid. These elements as well as the limit switches and certain other components are designated by the same numerals in FIG. 8 as used in the other drawings.

As shown in FIG. 8, there is provided a plug 90 for passing electrical power which may be derived from a conventional 115 volt AC source to a first power lead 91 through an on-off power switch and the limit switches 81 and 82, and through a fuse 92 to a second power lead 93.

Referring to the upper portion of the diagram, the up-down switch 35 has its down portion 35a connected in series with the adjustable control means 69 between the power lead 93 and 91. For purposes of illustration, it is assumed that the adjustable control means will energize a relay coil R1 for a given length of time depending upon the particular setting of the dial. This relay R1 operates simultaneously ganged relay contact switches S1, S2 and S3 as shown. Closing of the switch S1 will hold power to the adjustable control means between the power leads 93 and 91. Closing of the switch S2 will provide power from the lead 93 through a lead 94 to the motor 72 and thence back to the power lead 91 through lead 96. The lead 94 for the motor 72 operates the motor in a direction to drive the ram downwardly. Closure of the switch S3 will provide power from the lead 93 to the cutter delay control 78 from which power for the solenoid 59 is eventually provided in response to a given delay time after the motor 72 had been deenergized.

The up portion of the up-down switch 35 is illustrated at 35b and upon actuation will provide power from the power lead 93 through a lead 95 to the motor 72 and thence back to the power lead 91 through lead 96. When the motor is energized through the lead 95 it operates in a reverse direction and thus will drive the ram upwardly. As shown, the down portion and up portions of the up-down switch are ganged together so that it is only possible to operate one at a time.

With the foregoing circuit, it will be seen that depression of the down portion of the button 35a energizes the adjustable control means thereby closing the switches S1, S2, and S3 for a given length of time determined by the setting of the adjustable control means. The motor 72 will thus be energized as a consequence of closing of the switch arm S2. After the run time for the motor as determined by the adjustable control means has elapsed, the relay coil R1 becomes deenergized thereby simultaneously opening the switch arm S1, S2, and S3. The motor 72 is thus deenergized.

In the meantime, the cutter delay control 78 has been energized by the initial closing of the switch S3. The circuit in the cutter delay 78 is responsive to opening of the switch S3 at the end of the preset time period to in turn introduce a further delay before power is passed to the cutter solenoid 59. When the cutter solenoid is energized, the cutting operation of the extruded food is completed.

If the operator depresses the up side portion 35b of the up-down button, it will be noted that power is applied directly to the motor 72 between the leads 93 and 91. It will be evident that the motor may be driven to raise the ram at any time by simply depressing this up button so that it is not necessary to wait until the motor has driven the ram to its lower most position. There may be instances in which it is desired to raise the ram after only one or two food extrusions have been effected.

If the ram should reach either of its extreme lower or upper positions, one or the other of the limit switches 81 and 82 will automatically be opened thereby deenergizing the entire circuit. There is thus a built-in safety feature.

OPERATION:

Keeping the above construction in mind it can be understood how the disadvantages of conventional food extrusion machines are overcome or substantially eliminated by the present invention.

Initially the person such as a chef or home owner positions the extrusion plate 32 into the retaining recess 31 with the locating edges 42 and 43 mated against locating edges 45 and 46 so that the extrusion openings 33 and cutter holes 49 are perfectly aligned. A contained 26 filled with food product FP is then oriented with its radial lip 29 securely fitted in extrusion plate seating groove 34. Piston 25 is coupled to pressure plate 24 and lowered by movement of ram 21 into container 26 until it flushly engages the top surface of the food product FP. Food-extruding machine 10 may be either stood erectly with the severing means 47 sufficiently spaced above a collection conveyor or catch basket 89 (as shown in FIG. 7) or alternatively may be detachably secured against a wall by a bracket.

Before commencing the extrusion and severing operation the person adjusts the dial 70 of control means 69 to preselect relatively short, intermediate or relatively long sized food product extrusions.

To form the first batch of extrusions the person depresses the down-side portion 35a of switch 35 to turn on motor 72 and cause pinion gear 74 to drive the rack 22 and ram 21 downwardly. The extent of downward travel by ram 21 is determined by the run time of motor 72 which in turn is dictated by the adjustable position of dial 70 of control means 69.

As the ram 21 commences it extrusion stroke from its position of FIG. 5 to that of FIG. 6, the food product FP is compressed by piston 25 and slugs of food product are progressively extruded through the combined passages defined by extrusion openings 33 and cutter holes 49. The motor run time ceases when the ram has traveled through a longitudinal distance $L_1$ and food product extrusions 84 of length $L_2$ have been formed. Due to their composition and consistency food product extrusions 84 hang in place.

When the motor run time and additional overrunning or coast time has elapsed by time delay means 78, cutter solenoid 59 in the actuating means 50 is energized through lead 68. When the solenoid 59 of actuating means 50 is energized, its plunger 60 is retracted and moved into the wire coil in direction 86 as indicated in FIG. 7. As the severing means 47 is slid or translated from its noncutting position of FIG. 6 to its maximum cutting position of FIG. 7 the food product extrusions 84 of FIG. 6 are chopped by the cutter edges 48 to form food product extrusion chunks 87. So long as severing means 47 is moved a distance d then the chunks will be entirely severed and permitted to fall into catch basket 89.

When solenoid 59 is deenergized by the cutter delay control 78, return spring 51 restores severing means 47 to its original position shown in FIG. 5. The person may then repeat the extrusion and cutting cycle by again depressing the down-side portion 35a, of switch 35. After a number of cycles have been completed, depending on the overall length of ram 21 and distance of the extrusion strokes, the operator may, at any time, depress the up-side portion 35b of the switch 35 to drive the ram 21 upwardly to its initial starting position, at which time a new or replenished retainer 26 of food product can be positioned on extrusion plate 32. As a safety feature, limit switches 81 and 82 will deenergize the circuit should the ram reach its extreme lower or upper limits respectively.

In order to clean or otherwise service the severing means 47, referring to FIG. 3, it may be readily removed by disengaging its end 54 from spring 51, detaching the two or more wing nuts 57 and 58 and withdrawing securement rod 64 in a direction along its longitudinal axis. When the severing means 47 and its associated components have been cleaned or otherwise serviced then it can be easily installed for further use.

From the foregoing it will be evident that the present invention has provided a food extrusion machine in which all of the various advantages are fully realized.

What is claimed is:

1. A food-handling machine for producing food product extrusions and severing them into food chunks, comprising:
   a. a framework;
   b. a mounting structure coupled to the framework and formed with a retaining recess;
   c. an extrusion plate removably positioned in the retaining recess and being formed with a seating groove and plural extrusion openings;
   d. an elongated ram;
   e. a piston coupled to one end of the ram for compressing food product;
   f. a container for food product formed with open ends, one container end being sized to receive the piston and the other container end being sized to fit into the extrusion plate seating groove without contacting the framework;
   g. drive means for driving the ram from a retracted position to an extended position towards the extrusion plate;
   h. adjustable control means coupled to the drive means for controlling the driving duration and distance of ram travel in order to regulate the length of food product extrusions;
   i. severing means movably coupled to the mounting structure and including plural cutter edges defining cutter holes;
   j. actuating means carried by the framework and coupled to the severing means for forcing the severing means to travel from a first position where the cutter holes and extrusion openings are aligned to a second position where the cutter holes and extrusion opening are misaligned, the cutter edges operating to sever the food product extrusions into predetermined lengths as the severing means is moved from its corresponding first to second positions; and,
   k. time delay means for operating the actuating means only after driving action of said drive means has been stopped for a predetermined time period.

2. The structure according to claim 1, including:
guide means removably coupled to the mounting structure and arranged to slidably engage a portion of the severing means.

3. The structure according to claim 2, wherein the guide means is characterized by at least one bar that slidably engages and overlaps an edge portion of the severing means.

4. The structure according to claim 1, including:
a safety shield coupled to the severing means for covering the area where the severing means and actuating means are coupled together in order to protect a person from inadvertently inserting his hand in said area.

5. The structure according to claim 1, wherein:
the actuating means includes at least one solenoid with a plunger detachably coupled to the severing means, the solenoid operating to move the severing means to its second position upon being energized.

6. The structure according to claim 5, including:
a return spring fastened by its opposite ends to the mounting structure and severing means, the biasing force of the return spring operating to return the severing means to its first position upon deenergization of the solenoid.

7. The structure according to claim 1, wherein;
the extrusion plate is formed with an insert segment; and,
the mounting structure section that forms the retaining recess has a thickness substantially equivalent with the insert segment thickness so that the insert segment can lie spaced by a slight gap from the severing means.

8. The structure according to claim 7, including:
a first locating edge formed by the retaining recess; and,
a second locating edge formed by the extrusion plate insert segment and matched to the first locating edge so that the retaining recess and extrusion plate can be accurately aligned.

9. The structure according to claim 1, wherein;
the container is of cylindrical shape and said container other end has a radially inwardly extending lip shaped to fit in the seating groove.

10. The structure according to claim 1, including:
a platform defined by the framework and formed with a passage through which the ram extends, the platform being spaced from the mounting structure and structured to mount the drive means and adjustable control means.

11. The structure according to claim 10, wherein;
the drive means includes a motor coupled to a pinion gear, and,
the ram has a row of teeth along a first sidewall portion defining a rack interengaged with the pinion gear.

12. The structure according to claim 11, including:
a stationary guide pin coupled to the platform; and,
a guide slot in a second ram sidewall portion, the guide pin being inserted in the guide slot to restrict motion of the ram to a straight path.

13. The structure according to claim 10, wherein;
the platform is arranged above the mounting structure and includes a raised wall, and,
a hood is provided having a bottom portion forming a skirt that seats upon and overlaps a top section of the platform raised wall.

14. The structure according to claim 10, including:
a first cam coupled adjacent the top of the ram;
a second cam coupled adjacent the bottom of the ram; and,
first and second limit switches carried by the platform arranged to coact with the first and second cams respectively when the ram has traveled to its extreme lower and extended upper positions respectively.